Patented Sept. 2, 1952

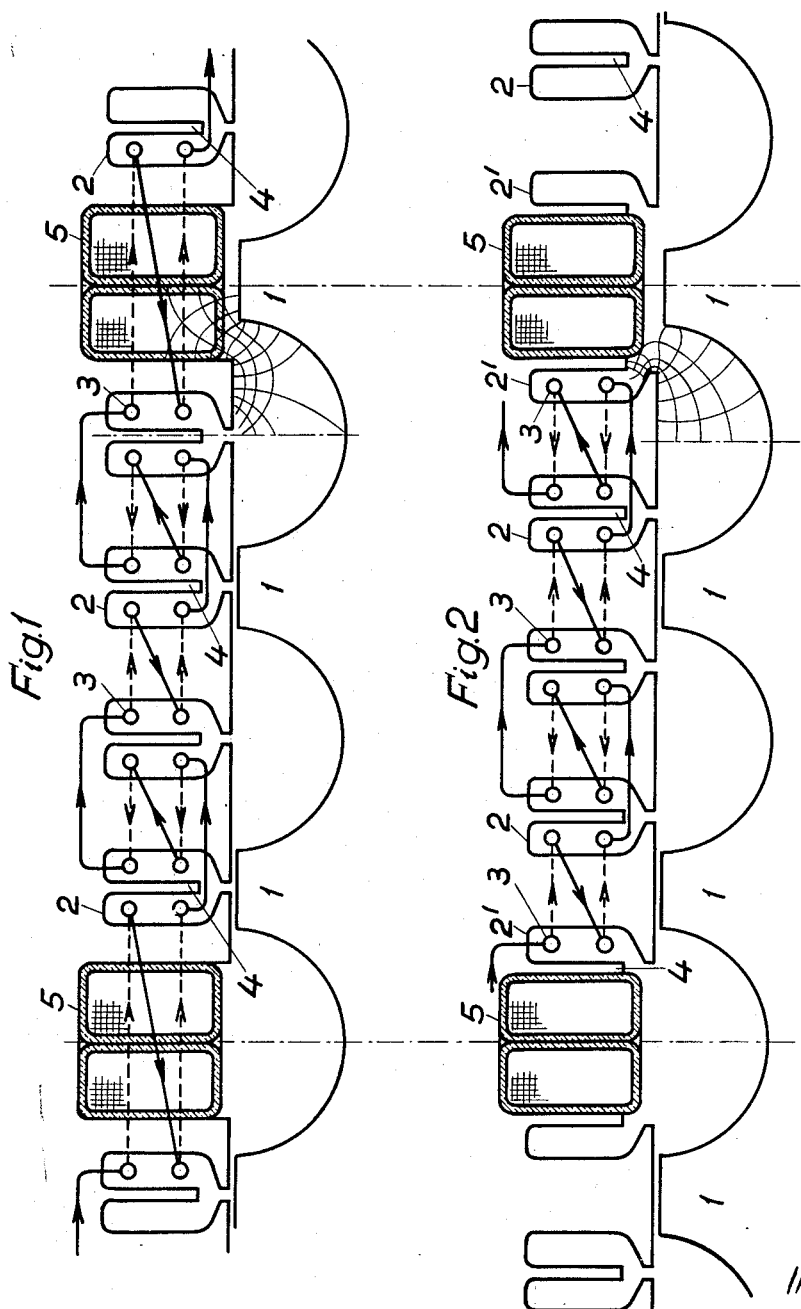

2,609,412

UNITED STATES PATENT OFFICE 2,609,412

ELECTRIC HIGH-FREQUENCY GENERATOR

Ludwig Dreyfus, Vasteras, Sweden, assignor to Allmanna Svenska Elektriska Aktiebolaget, Vasteras, Sweden, a Swedish corporation Application October 12, 1951, Serial No. 250,979
In Sweden July 14, 1951

2 Claims. (Cl. 171—252)

1

Electric generators for high frequency alternating current, especially those employed for operating eddy current furnaces for melting and cognate metallurgical purposes, are frequently made with only one winding slot per high frequency pole which gives a maximum voltage per winding turn. If such machines are designed for high speeds (3,000 revolutions per minute or more) and for moderate frequencies (about 500 cycles per second), their slot pitch will, however, be rather large, and as on the other hand a full utilisation of the machine requires a certain current density per unit length of the air gap periphery, the total current volume in each slot will be larger than in the smaller or relatively slowly running machines hitherto normally employed. Hereby it will be more difficult to convey off the heat developed in the slot conductors, since for instance at a certain current density in the conductors the said heat is substantially proportional to the cross section of the slot, while the heat conduction is substantially proportional to the periphery of the slot.

According to the present invention, there is arranged in the slot, for improving the heat removal, one or more partitions which are integral with the rest of the laminated iron core and project from the back thereof but terminate at a certain distance from the edge of the slot so as to exert no essential influence on the leakage flux or other magnetic phenomena. The only purpose of these partitions is to increase the heat admitting surface between the winding and the iron core, and for making the heat conduction to the latter efficient the partitions must be integral therewith.

In the accompanying drawing, Fig. 1 and 2 show diagrammatically two forms of the invention. Both figures show a rectified portion of the stator with the corresponding portion of the rotor of a high frequency generator.

The rotor of the generator is in both forms of the same type having a number of teeth 1, each representing one pole pair, as the high frequency flux variation in the air gap is caused by the variation in reluctance between a tooth and an adjacent groove, and these together thus represent a full wave of the flux. To each such full wave there correspond two slot pitches in the stator, thus one slot per high frequency pole. The winding 3 in the slots 2 may for instance be arranged as shown in the drawing, the full lines designating connections on the front side of the tooth and the dotted lines connections on its rear side. The current will then circulate clockwise around every second tooth and anticlockwise around the rest, as seen from the air gap.

2

According to the forms of the invention illustrated, each slot 2 contains a partition 4 separating the winding portions surrounding different teeth and being integral with the rest of the iron core so as to contribute efficiently to the removal of heat from the winding, while at the same time it is terminated at so large a distance from the mouth of the slot that it will not appreciably increase the leakage flux around the winding portions.

High frequency generators are often made with alternating polarity in the air gap, generally created by a direct current winding in the stator, each coil of said winding embracing a limited number of teeth of the high frequency winding and creating alternatively north and south poles in the said groups of teeth. Figs. 1 and 2 show somewhat different forms of the slots for such direct current windings. It can of course not be avoided that these slots encroach upon the space available for the high frequency slots, but in using high numbers of revolutions and a comparatively low frequency of the alternating current, the number of alternating current slots lost in this way may be reduced to one per pole pitch of the direct current winding, as shown in the drawing.

The number of high frequency slots per direct current excited pole should be an even one, because otherwise the air gap reluctance would vary too much along the pole arc with the position of the rotor teeth with respect to the direct current excited poles. In Fig. 1 only one half of a high frequency tooth lies adjacent to each slot 5 of the direct current winding, whence the high frequency winding also embraces the slot 5. The result hereof is, however, that the slot containing the direct current winding will be subjected to a comparatively strong alternating current field, as is shown by the flux lines in the figure, said field causing eddy current losses in said winding. When the high frequency slots are divided according to the present invention, it will therefore be more appropriate to use an arrangement according to Fig. 2, in which a high frequency slot of half the normal width lies adjacent to the direct current slot 5 and is separated therefrom only by a partition 4 of the same type as those dividing the normal high frequency slots. As shown by the figure, the flux distribution of the high frequency field will then be quite different, leaving the direct current slot practically free.

The arrangement according to Fig. 2 gives under otherwise equal conditions somewhat less width of the slot 5 than that according to Fig. 1. If there would be an insufficient space for the direct current winding as a consequence of this, the pitch of the high frequency teeth may instead be somewhat reduced and their saturation increased. On the other hand, the tooth pitch may be somewhat increased if the space in the direct current slots would be found unnecessarily large.

I claim as my invention:

1. A high frequency alternating current generator, especially for high speeds, having one stator winding slot per pole of its high frequency winding, each such slot containing at least one partition projecting from its bottom and integral therewith and terminating at a distance from its mouth sufficient to exclude any substantial magnetic influence of said partition, and a rotor having teeth of a pitch equal to twice the pitch of said stator slots.

2. A high frequency alternating current generator comprising a stator having one winding slot per pole of its high frequency winding, each such slot containing at least one partition projecting from its bottom and integral therewith and terminating at a substantial distance from the mouth of said slot, said stator also having slots containing a direct current magnetizing winding and at each side of each of said last-mentioned slots an alternating current winding slot of half the normal width separated from the direct current slot by a partition of the same type as those contained in the normal slots.

LUDWIG DREYFUS.

No references cited.